US012673419B2

(12) United States Patent
Hatanaka et al.

(10) Patent No.: US 12,673,419 B2
(45) Date of Patent: Jul. 7, 2026

(54) ROBOT CONTROLLER

(71) Applicant: FANUC CORPORATION, Yamanashi (JP)

(72) Inventors: Kokoro Hatanaka, Yamanashi (JP); Shintarou Hori, Yamanashi (JP); Yasuhiro Naitou, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 213 days.

(21) Appl. No.: 18/008,709

(22) PCT Filed: Jun. 21, 2021

(86) PCT No.: PCT/JP2021/023346
§ 371 (c)(1),
(2) Date: Dec. 7, 2022

(87) PCT Pub. No.: WO2021/261426
PCT Pub. Date: Dec. 30, 2021

(65) Prior Publication Data
US 2023/0219219 A1 Jul. 13, 2023

(30) Foreign Application Priority Data
Jun. 25, 2020 (JP) ................................. 2020-109582

(51) Int. Cl.
*B25J 9/00* (2006.01)
*B25J 9/16* (2006.01)
*B25J 13/08* (2006.01)
(52) U.S. Cl.
CPC ........... *B25J 9/1653* (2013.01); *B25J 9/0081* (2013.01); *B25J 9/1664* (2013.01); *B25J 9/1674* (2013.01); *B25J 13/085* (2013.01)

(58) Field of Classification Search
CPC ...... B25J 9/1653; B25J 9/0081; B25J 9/1664; B25J 9/1674; B25J 13/085; B25J 19/06; (Continued)

(56) References Cited

U.S. PATENT DOCUMENTS 5,363,474 A     11/1994 Sarugaku et al.
9,902,059 B2 *   2/2018 Sonoda ...................... B25J 9/16
(Continued)

FOREIGN PATENT DOCUMENTS

DE     202014106213 U1     3/2016
EP          0540753 A1     5/1993
(Continued)

OTHER PUBLICATIONS

Identifying Mass Parameters for Gravity Compensation and Automatic Torque Sensor Calibration, (Year: 1996).*
(Continued)

*Primary Examiner* — Ian Jen
(74) *Attorney, Agent, or Firm* — KARCESKI IP LAW, PLLC

(57) ABSTRACT

A robot controller includes a storage unit that stores load information including a mass and a center of gravity position of a load to be attached to a robot; a lead-through control unit that controls the robot comprising a sensor that detects an external force, based on the external force detected by the sensor and the load information stored in the storage unit; and a load suitability determining unit that determines whether or not the load information stored in the storage unit is suitable. In response to the load suitability determining unit determining that the load information has a possibility of being unsuitable, the lead-through control unit performs a restriction on a movement of the robot.

7 Claims, 8 Drawing Sheets

(58) Field of Classification Search
CPC .......... G05B 2219/36401; G05B 2219/39194;
G05B 2219/40599; G05B 19/423
See application file for complete search history.

(56) References Cited

U.S. PATENT DOCUMENTS

| | | | | |
|---|---|---|---|---|
| 10,016,894 | B2* | 7/2018 | Hietmann | B25J 9/1674 |
| 10,076,843 | B2* | 9/2018 | Kato | G05B 19/425 |
| 10,300,608 | B2* | 5/2019 | Murakami | B25J 13/085 |
| 10,350,765 | B2* | 7/2019 | Ueberle | B25J 13/085 |
| 10,564,635 | B2* | 2/2020 | Sato | B25J 13/085 |
| 10,583,558 | B2* | 3/2020 | Ikeda | B25J 9/1633 |
| 10,639,799 | B2* | 5/2020 | Katou | B25J 13/085 |
| 11,072,069 | B2* | 7/2021 | Ohashi | B25J 9/1638 |
| 11,358,276 | B2* | 6/2022 | Nakayama | B25J 13/085 |
| 11,433,531 | B2* | 9/2022 | Izumi | B25J 9/1633 |
| 11,507,044 | B2* | 11/2022 | Maekawa | G05B 19/404 |
| 2006/0178775 | A1* | 8/2006 | Zhang | B25J 9/0081 |
| | | | | 700/245 |
| 2015/0290809 | A1 | 10/2015 | Nakagawa et al. | |
| 2016/0121484 | A1* | 5/2016 | Ikeda | B25J 9/1674 |
| | | | | 700/256 |
| 2016/0375588 | A1* | 12/2016 | Ueberle | B25J 13/085 |
| | | | | 700/258 |
| 2017/0015004 | A1 | 1/2017 | Osaka et al. | |
| 2018/0200881 | A1* | 7/2018 | Ishii | B25J 19/06 |
| 2018/0200885 | A1* | 7/2018 | Ikeda | B25J 9/1692 |
| 2019/0361558 | A1* | 11/2019 | Ko | H10K 59/40 |
| 2020/0147787 | A1* | 5/2020 | Takahashi | B25J 9/1633 |

FOREIGN PATENT DOCUMENTS

| | | | |
|---|---|---|---|
| EP | 3656514 | A1 | 5/2020 |
| JP | H0355189 | A | 3/1991 |
| JP | H04344505 | A | 12/1992 |
| JP | 2004167666 | A | 6/2004 |
| JP | 2015199174 | A | 11/2015 |
| JP | 2016087700 | A | 5/2016 |
| JP | 2018111174 | A | 7/2018 |
| JP | 2018114577 | A | 7/2018 |
| JP | 2019018340 | A | 2/2019 |
| JP | 2019030931 | A | 2/2019 |
| JP | 2019055458 | A | 4/2019 |
| WO | 9221076 | A1 | 11/1992 |

OTHER PUBLICATIONS

Gravity Compensation of robot control system (Year: 1996).*
18008709.NPL (Year: 2006).*
Japanese Office Action dated Mar. 5, 2023, for Japanese Patent Application No. 2002-531962.
C. G. Atkeson, et al., "Estimation of Inertial Parameters of Manipulator Loads and Links", The International Journal of Robotics Research, vol. 5, Issue 3, pp. 101-119, Sage journals, https://doi.org/10.1177/027836498600500306 (Sep. 1986).
International Search Report dated Sep. 7, 2021, for International Patent Application No. PCT/JP2021/023346.
Chinese Office Action dated Mar. 13, 2025, for Chinese Patent Application No. 202180044213.2.

* cited by examiner

ROBOT CONTROLLER

CROSS-REFERENCE TO RELATED APPLICATION(S)

This is a National Stage Entry into the United States Patent and Trademark Office from International Patent Application No. PCT/JP2021/023346, filed on Jun. 21, 2021, which relies on and claims priority to Japanese Patent Application No. JP 2020-109582, filed on Jun. 25, 2020, the entire contents of both of which are incorporated herein by reference.

FIELD OF THE INVENTION

The present disclosure relates to a robot controller.

BACKGROUND OF THE INVENTION

It is known that a user directly pushes and manipulates the robot arm with the user's hand while teaching, so-called lead-through teaching (for example, see Japanese Unexamined Patent Application, Publication No. 2019-55458).

SUMMARY OF THE INVENTION

An aspect of the preset disclosure is directed to a robot controller comprising: a storage unit that stores load information including a mass and a center of gravity position of a load to be attached to a robot; a lead-through control unit that controls the robot comprising a sensor that detects an external force, based on the external force detected by the sensor and the load information stored in the storage unit; and a load suitability determining unit that determines whether or not the load information stored in the storage unit is suitable, wherein, in response to the load suitability determining unit determining that the load information has a possibility of being unsuitable, the lead-through control unit performs a restriction on a movement of the robot.

BRIEF DESCRIPTION OF THE DRAWINGS

FIG. 3 is a block diagram illustrating a lead-through control unit of the robot controller in FIG. 1.

FIG. 7 is a block diagram illustrating a lead-through control unit of the robot controller in FIG. 6.

DESCRIPTION OF EMBODIMENT(S) OF THE INVENTION

Figure 2:
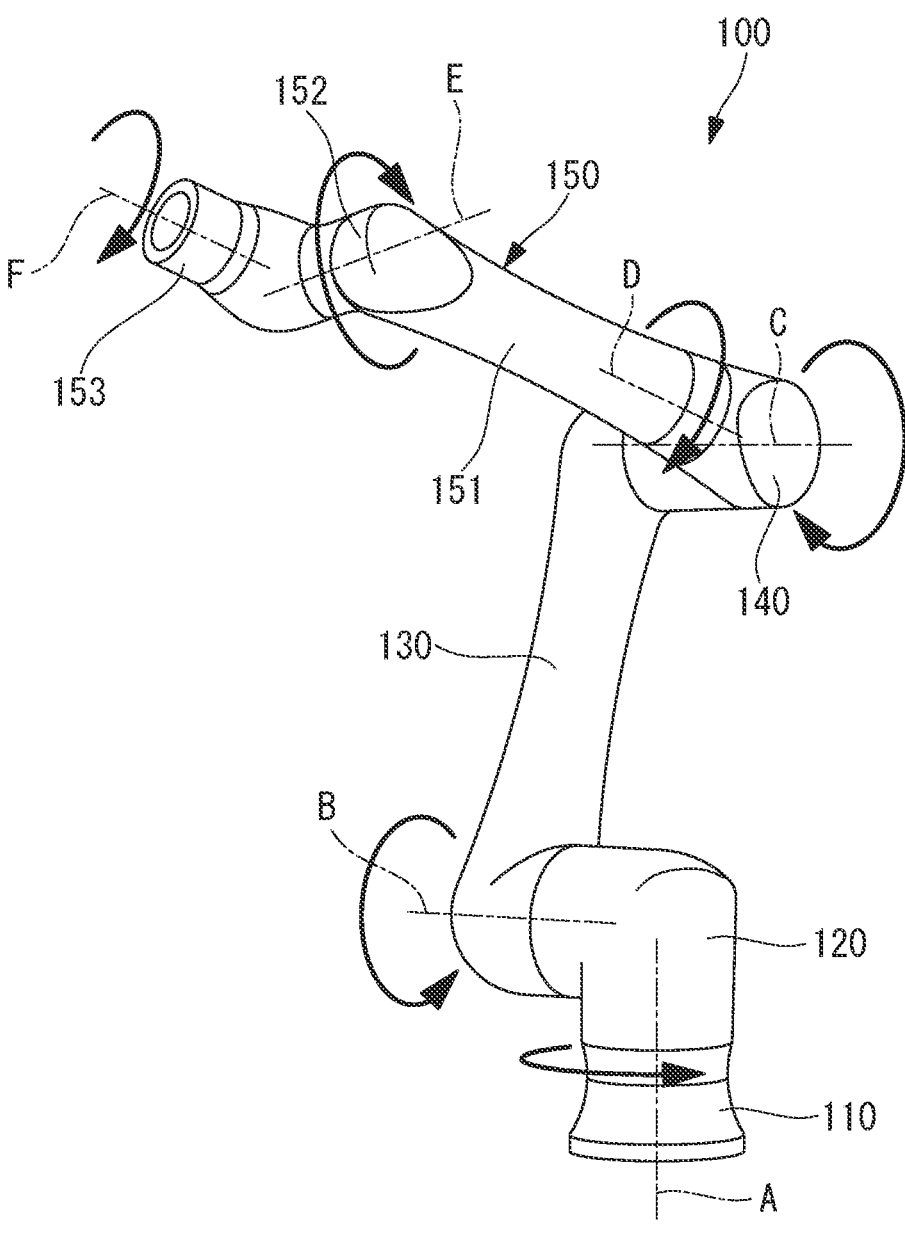
FIG. 2 is a schematic view showing a robot controlled by the robot controller in FIG. 1.

A robot controller 1 according to the first embodiment of the present disclosure will be described below with reference to the drawings. The robot controller 1 according to the present embodiment is a controller for controlling a robot 100 shown in FIG. 2, for example.

The robot 100 is a vertical 6-axis articulated cooperative robot, and comprises a base 110 mounted on a floor surface, a swivel body 120 rotatably supported with respect to the base 110 around a vertical first axis A, and a first arm 130 rotatably supported with respect to the swivel body 120 around a horizontal second axis B. The robot 100 also comprises a second arm 140 rotatably supported about a third axis C parallel to the second axis B with respect to the first arm 130, and a three-axis wrist unit 150 provided at the end of the second arm 140.

The wrist unit 150 comprises a first wrist element 151 rotatably supported with respect to the second arm 140 about a fourth axis D disposed in a plane including the first axis A, and a second wrist element 152 rotatably supported with respect to the first wrist element 151 about a fifth axis E orthogonal to the fourth axis D. Furthermore, the wrist unit 150 comprises a third wrist element 153 rotatably supported by the second wrist element 152 around a sixth axis F that is disposed in a plane parallel to the fourth axis D and is orthogonal to the fifth axis E.

A torque sensor (sensor) 160 that detects an external force acting on the robot 100 is disposed on each axis of the robot 100. The torque sensor 160 may be provided on each axis or on one or more of the axes. Another sensor, such as a force sensor, may be employed instead of the torque sensor 160.

Figure 1:
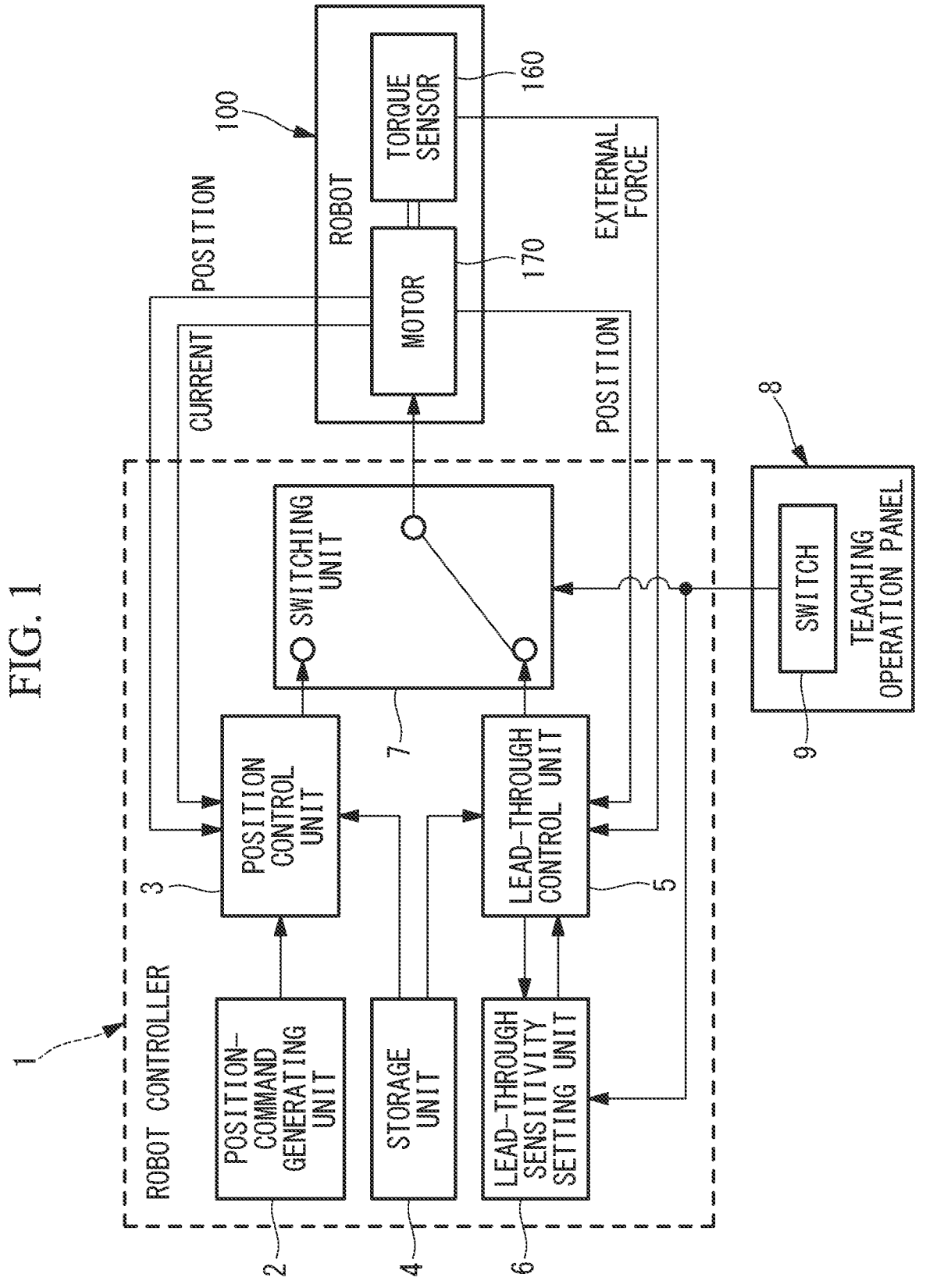
FIG. 1 is a block diagram showing an example of a robot controller for the first embodiment of the present disclosure.

The robot controller 1 comprises at least one processor and memory and also comprises, as shown in FIG. 1, a position command generating unit 2, a position control unit 3, a storage unit 4, a lead-through control unit 5, a lead-through sensitivity setting unit (load suitability determining unit) 6, and a switching unit 7. In addition, a teaching operation panel 8 is connected to the robot controller 1, and the teaching operation panel 8 comprises a switch 9.

The position command generating unit 2 generates a position command based on a pre-taught teaching program or user operation. The position control unit 3 controls a motor 170 of each axis of the robot 100 based on the position command generated by the position command generating unit 2.

The lead-through control unit 5 controls the robot 100 based on the external force detected by the torque sensor 160 provided on the robot 100. The lead-through sensitivity setting unit 6 sets the sensitivity of the lead-through control.

The switch 9 is, for example, a switch that is turned on by the user's finger and turned off by releasing the finger.

The switching unit 7 switches to the lead-through control when the switch 9 is in the ON state and switches to the position control when the switch 9 is in the OFF state.

The storage unit 4 stores load information, such as a mass and a center of gravity position of each part of the robot 100, as well as a mass and a center of gravity position of a hand, a workpiece, or the like attached to the robot 100.

The mass and the center of gravity position of each part of the robot 100 is known, and thus accurate information is assumed to be stored. The mass and the center of gravity position of the load may not be set accurately because they are set by the user each time the load is changed.

The load information stored in the storage unit 4 is input to the position control unit 3. Also, current information from the motor 170 of each axis of the robot 100 and position information from an encoder (not shown) provided on the motor 170 is fed back to the position control unit 3.

The lead-through control unit 5 receives the load information stored in storage unit 4 and the position information from the encoder.

Figure 3:
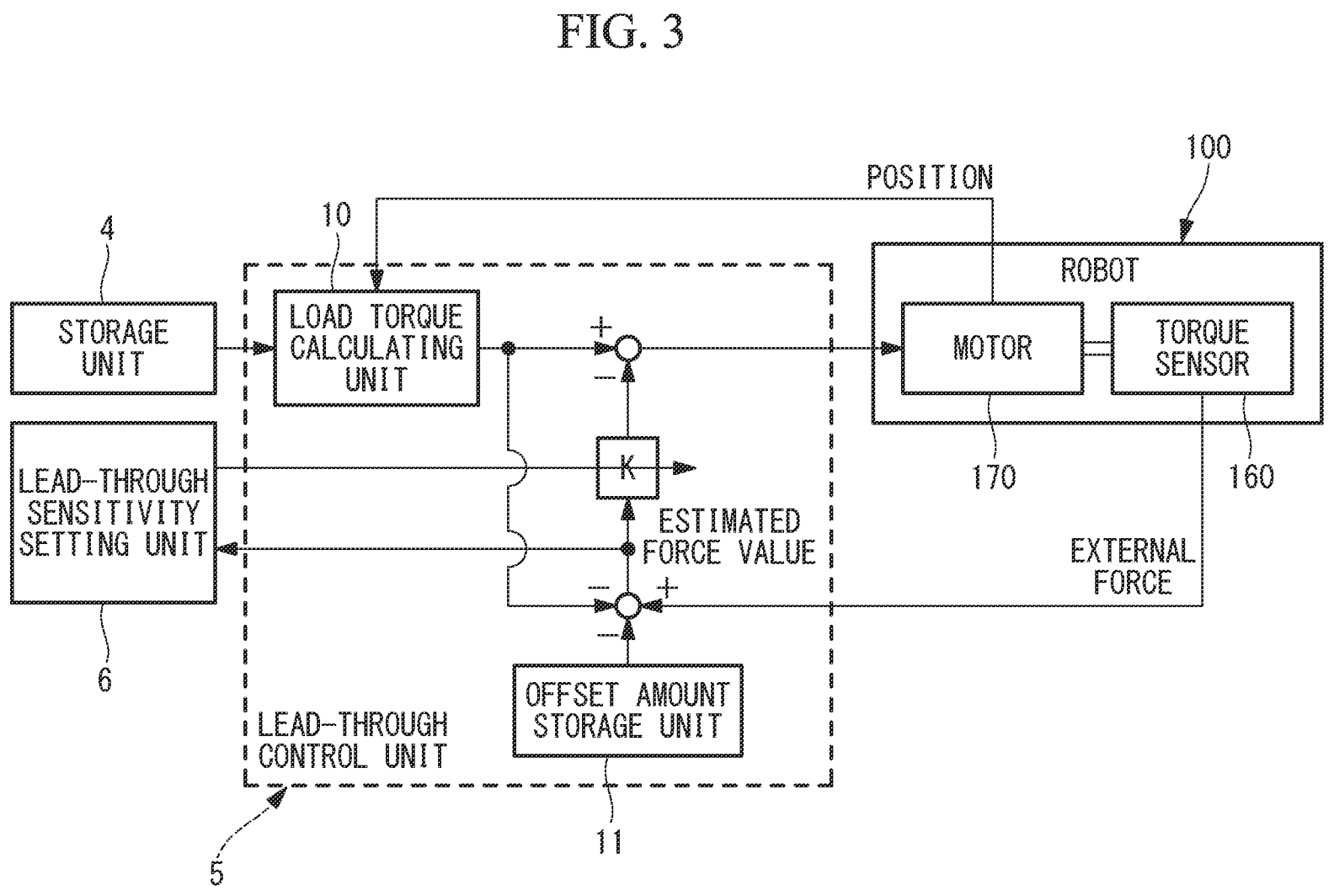

As shown in FIG. 3, the lead-through control unit 5 comprises a load torque calculating unit 10 and an offset amount storage unit 11.

The load torque calculating unit 10 successively calculates a gravity load torque based on the load information input from the storage unit 4 and the position information input from the encoder.

The offset amount storage unit 11 stores the offset amount of the torque sensor 160.

The lead-through control unit 5 subtracts the offset amount stored in the offset amount storage unit 11 and the gravity load torque calculated by the load torque calculating unit 10 from the external force detected by the torque sensor 160. By so doing, an estimate force value applied by the user to the robot 100 is calculated.

The lead-through control unit 5 then calculates the torque command to the motor 170 by subtracting a value obtained by multiplying the calculated estimated force value by the gain K from the gravity load torque calculated by the load torque calculating unit 10. The gain K is 0≤K≤1. The closer K=0, the more sensitive the lead-through control becomes. The closer K=1, the less sensitive the lead-through control becomes.

Figure 4:
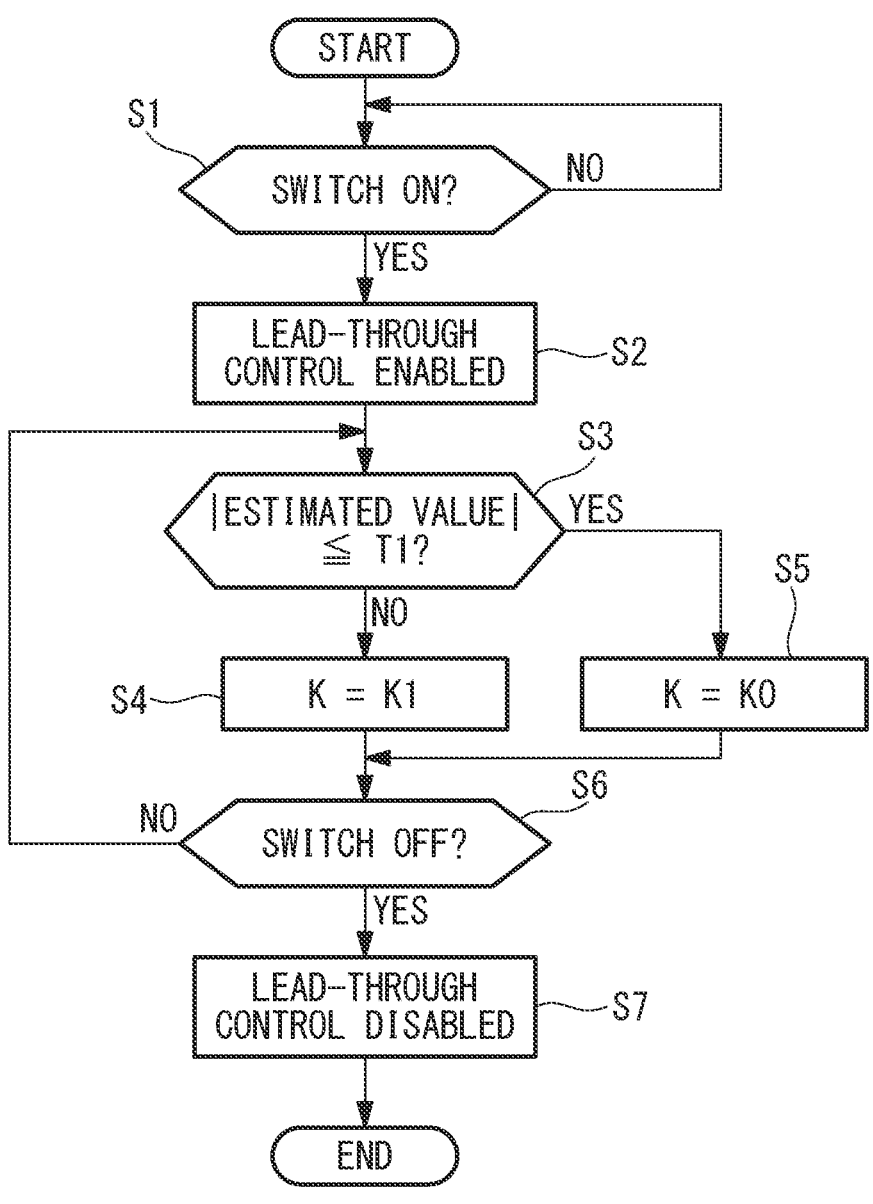
FIG. 4 is a flowchart illustrating lead-through control by the robot controller in FIG. 1.

The state of the switch 9 and the estimated force value calculated by the lead-through control unit 5 are input to the lead-through sensitivity setting unit 6. As shown in FIG. 4, the lead-through sensitivity setting unit 6 determines whether or not the switch 9 is pressed (step S1) and waits until the switch 9 is pressed.

When the switch 9 is pressed, lead-through control is switched to be enabled (step S2), and the absolute value of the estimated force value input from the lead-through control unit 5 is determined whether or not it is equal to or less than the threshold value T1 (step S3). If the absolute value of the estimated value is greater than the threshold value T1, the gain K of the lead-through control unit 5 is set to a predetermined value K1 close to 1 (step S4).

If the absolute value of the estimated value is equal to or less than the threshold value T1, the lead-through sensitivity setting unit 6 sets the gain K of the lead-through control unit 5 to K0, which is smaller than K1 (step S5). The threshold value T1 can be set appropriately if necessary.

Then, the lead-through control is performed using the set gain K, and the processes from step S2 are repeated until the switch 9 is turned off (step S6).

That is, if the calculated estimated force value is greater than the threshold value T1 when the switch 9 is first switched to the ON state, the load information has a possibility of being inaccurate, and the sensitivity of the lead-through control is reduced by increasing the gain K. On the other hand, if the absolute value of the estimated value becomes equal to or less than the threshold value T1 during the lead-through control with the sensitivity reduced by increasing the gain K, the gain K is set to K0 (step S5).

After the switch 9 is turned off in the process of step S6, the lead-through control is switched to disabled (step S7) to complete the procedure.

With such a configuration of the robot controller 1 according to this embodiment, when the lead-through control is started, if the absolute value of the first calculated estimate value is greater than the threshold value T1, the sensitivity of the lead-through control is reduced. This has an advantage in that the movement of the robot 100 can be ristricted according to the force applied by the user, and even when inaccurate load information is stored, it is possible to prevent the robot 100 from moving abruptly in a direction unintended by the user.

On the other hand, if the absolute value of the estimated value becomes equal to or less than the threshold value T1 during the lead-through control with reduced sensitivity, the sensitivity is increased. As a result, the robot 100 can move smoothly in response to the force applied by the user, facilitating work with the lead-through control. Even if inaccurate load information is set, it is possible to prevent abrupt movement in a direction unintended by the user and improve workability with the increased sensitivity in a state in which the estimated force value is small.

In this embodiment, as an example of a restriction on the movement of the robot 100 by the lead-through control unit 5, the sensitivity of the lead-through control is reduced by increasing the gain K of the lead-through control. Instead of, or in addition to this, the distance of movement of the robot 100 that moves in response to the force applied by the user in the lead-through control may be restricted to a predetermined value or less.

Figure 5:
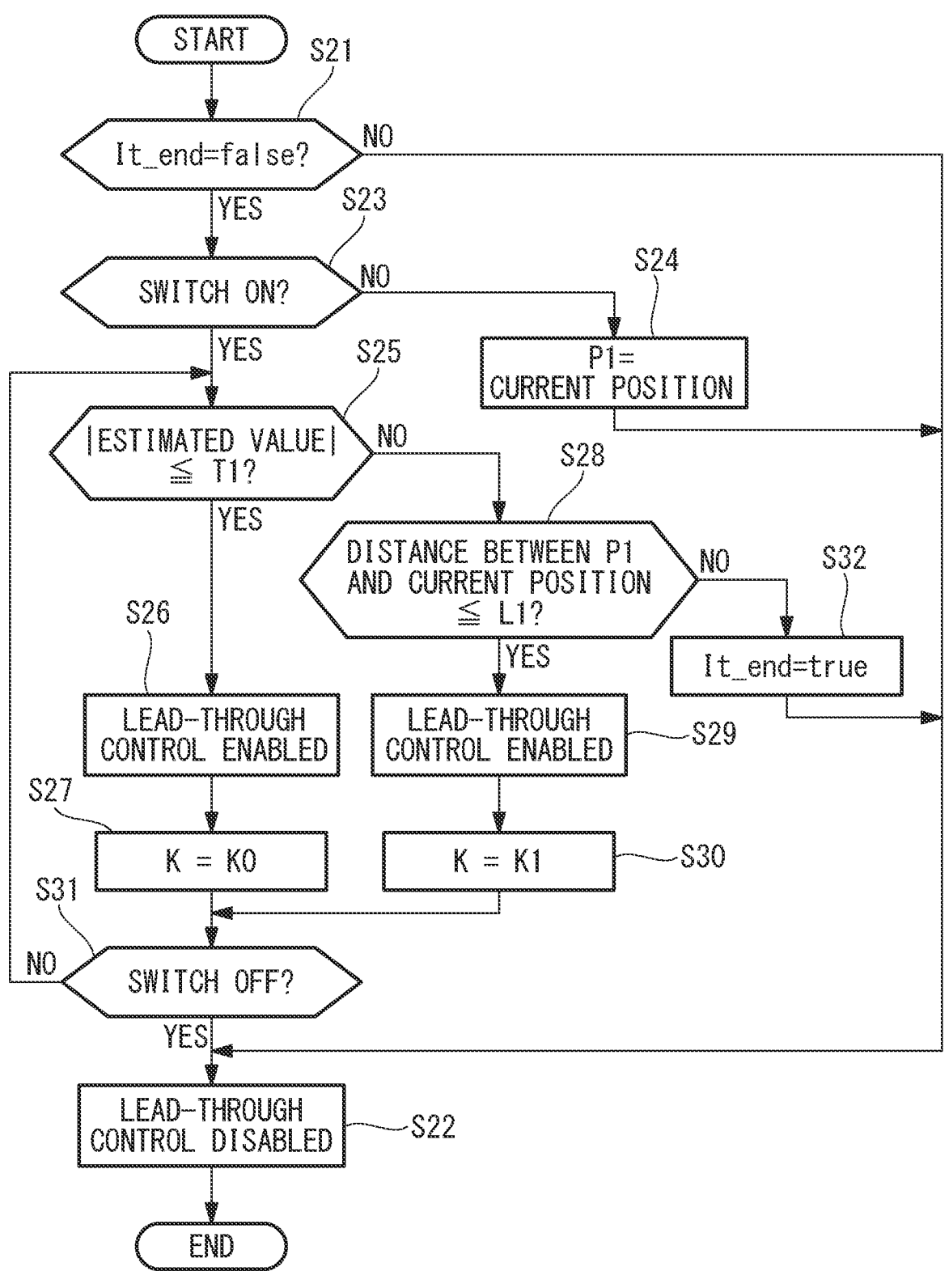
FIG. 5 is a flowchart showing a variation of the lead-through control in FIG. 4.

For example, as shown in FIG. 5, it is determined whether or not the flag It_end, which indicates that the process ended in an abnormal state, is normal (false)(step S21), and if it is abnormal, the lead-through control is disabled (step S22). Flag It_end is initialized to normal (false) when the abnormal state is cleared.

On the other hand, if the flag It_end is false, it is determined whether or not the switch 9 is in the ON state (step S23). If the switch 9 is not in the ON state, the current position is stored as P1 (step S24).

On the other hand, when the switch 9 is turned on, it is determined whether or not the absolute value of the estimated force value is equal to or less than the predetermined threshold value T1 (step S25). If the absolute value of the estimated value is equal to or less than the threshold value T1, the switching unit 7 is switched to enable the lead-through control (step S26), and the gain of the lead-through control is set to K0 to increase the sensitivity of the lead-through control (step S27).

On the other hand, if the absolute value of the estimated value is greater than the threshold value T1, it is determined whether or not the distance between the current position and P1 stored in step S24 is equal to or less than a predetermined threshold value L1 (step S28). If the distance is equal to or less than the threshold value L1, the switching unit 7 is switched to enable the lead-through control (Step S29), the gain of the lead-through control is set to K1, and the sensitivity of the lead-through control is reduced (Step S30).

The lead-through control continues until the switch 9 is switched to the OFF state, in which case the processes from step S25 are repeated (step S31). After the switch 9 is switched to the OFF state, the lead-through control is switched to disabled (step S22).

On the other hand, if it is determined in step S28 that the distance between the current position and P1 is greater than the threshold value L1, the flag It_end is switched to abnormal (true) (step S32) and the lead-through control is switched to disable (step S22).

That is, if the absolute value of the estimated force value is greater than the threshold value T1, the set load information has a possibility of being inaccurate, and thus, in addition to reducing the sensitivity of the lead-through control, the travel distance is prevented from being excessive. Even if inaccurate load information is set, if the distance of the movement of the robot 100 is short, the robot 100 can be prevented from moving significantly in a direction that the user does not intend. This has an advantage in that the robot 100 can be more reliably prevented from moving abruptly in a direction unintended by the user.

As another restriction on the movement of the robot 100, the axes of the robot 100 may be restricted to move in response to the force applied by the user. For example, by restricting the lead-through control to only the three wrist axes of the wrist unit 150, it is possible to prevent the robot 100 from moving significantly in a direction unintended by the user.

Next, the robot controller 50 according to the second embodiment of the present disclosure will be described below with reference to the drawings.

Figure 6:
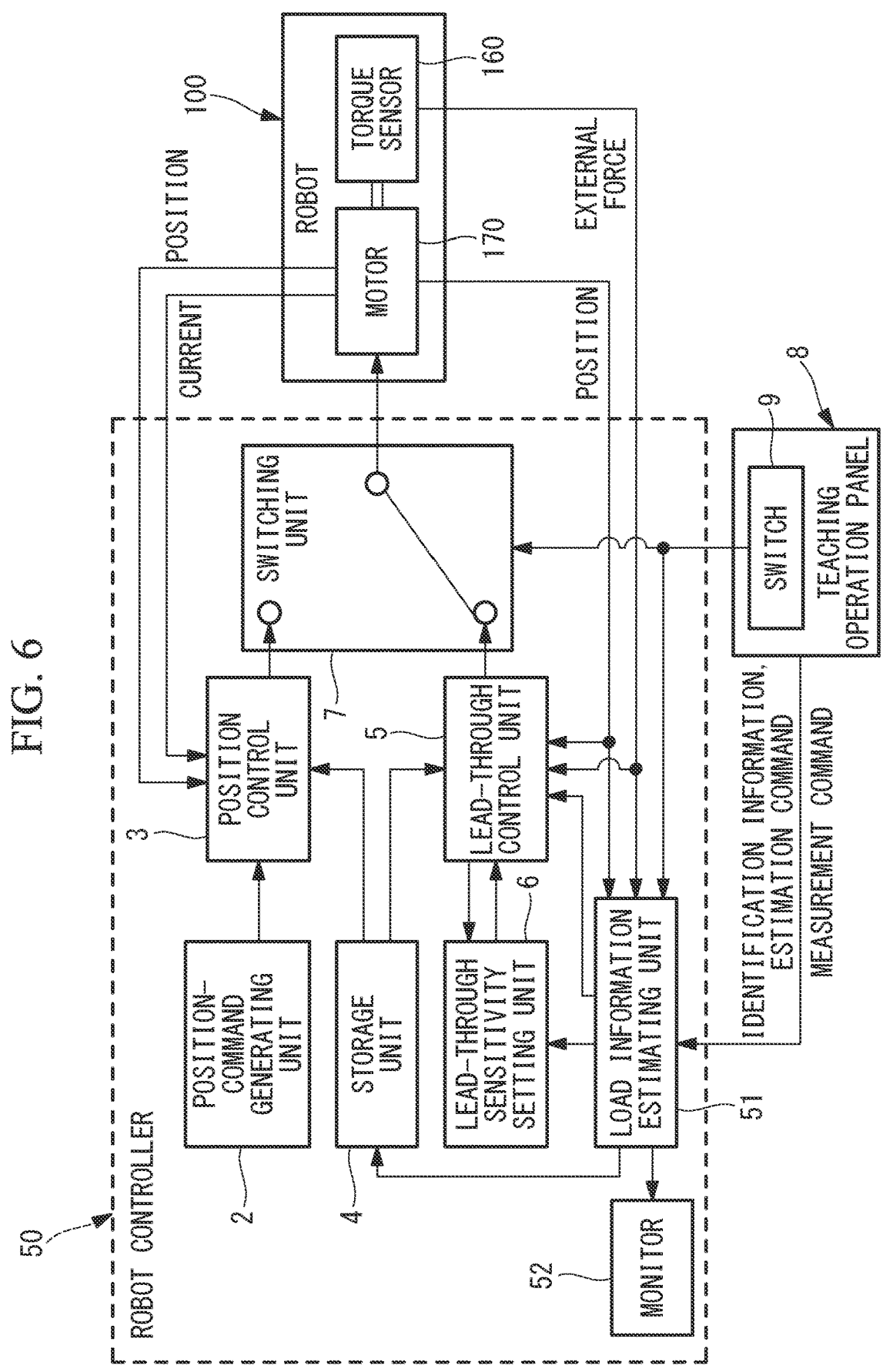
FIG. 6 is a block diagram showing an example of a robot controller for the second embodiment of the present disclosure.
Figure 7:
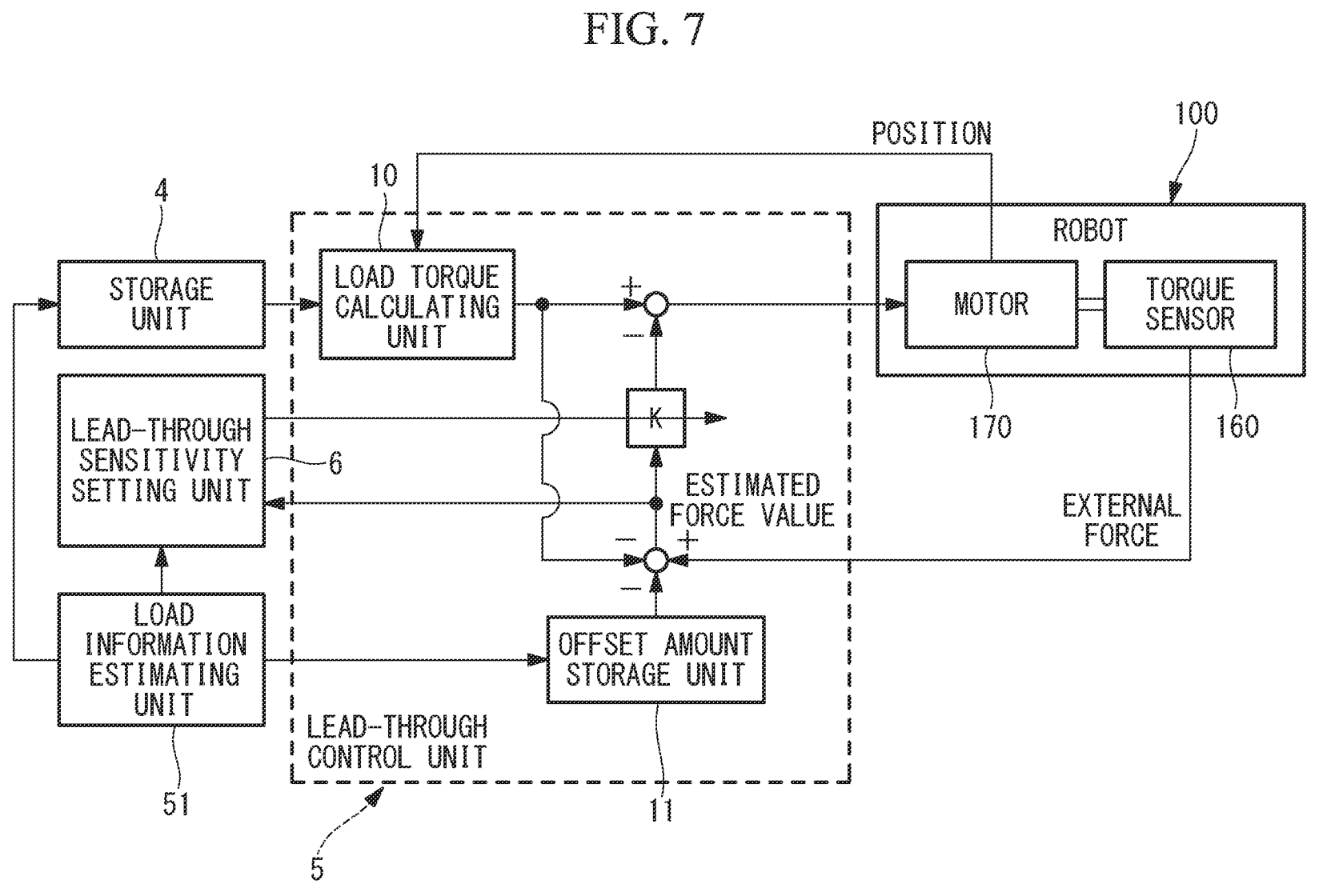

As shown in FIGS. 6 and 7, the robot controller 50 of this embodiment differs from the robot controller 1 of the first embodiment in that it comprises a load information estimating unit 51. In the figure, reference number 52 indicates a monitor.

For example, when load identification information and a load information estimation command are input at the teaching operation panel 8, the load information estimating unit 51 sequentially displays on the monitor 52 a plurality of postures of the robot 100 for estimating the load information. The load information estimating unit 51 then instructs the user to move the robot 100 by the lead-through control to the indicated posture.

When, according to the instructions, the user switches the switch 9 to the ON state and the robot 100 is moved to a position near the displayed posture by the lead-through control, the load information estimating unit 51 instructs the user to input a measurement command. When the user inputs the load identification information and the measurement command according to the instructions, the load information estimating unit 51 records the external force detected by the torque sensor 160 at that time and the position of the motor 170.

The load information estimating unit 51 then solves the equation of movement of the robot 100 by recording the external force for the three axes and the position of the motor 170 in three or more postures of the wrist unit 150 in which the gravity is applied in different ways, whereby the mass of the load, the center of gravity position, and the offset amount of the torque sensor 160 can be estimated. The estimated mass and center of gravity position of the load are stored in the storage unit 4 in association with load identification information. The estimated offset amount is stored in the offset amount storage unit 11 of the lead-through control unit 5.

Figure 8:
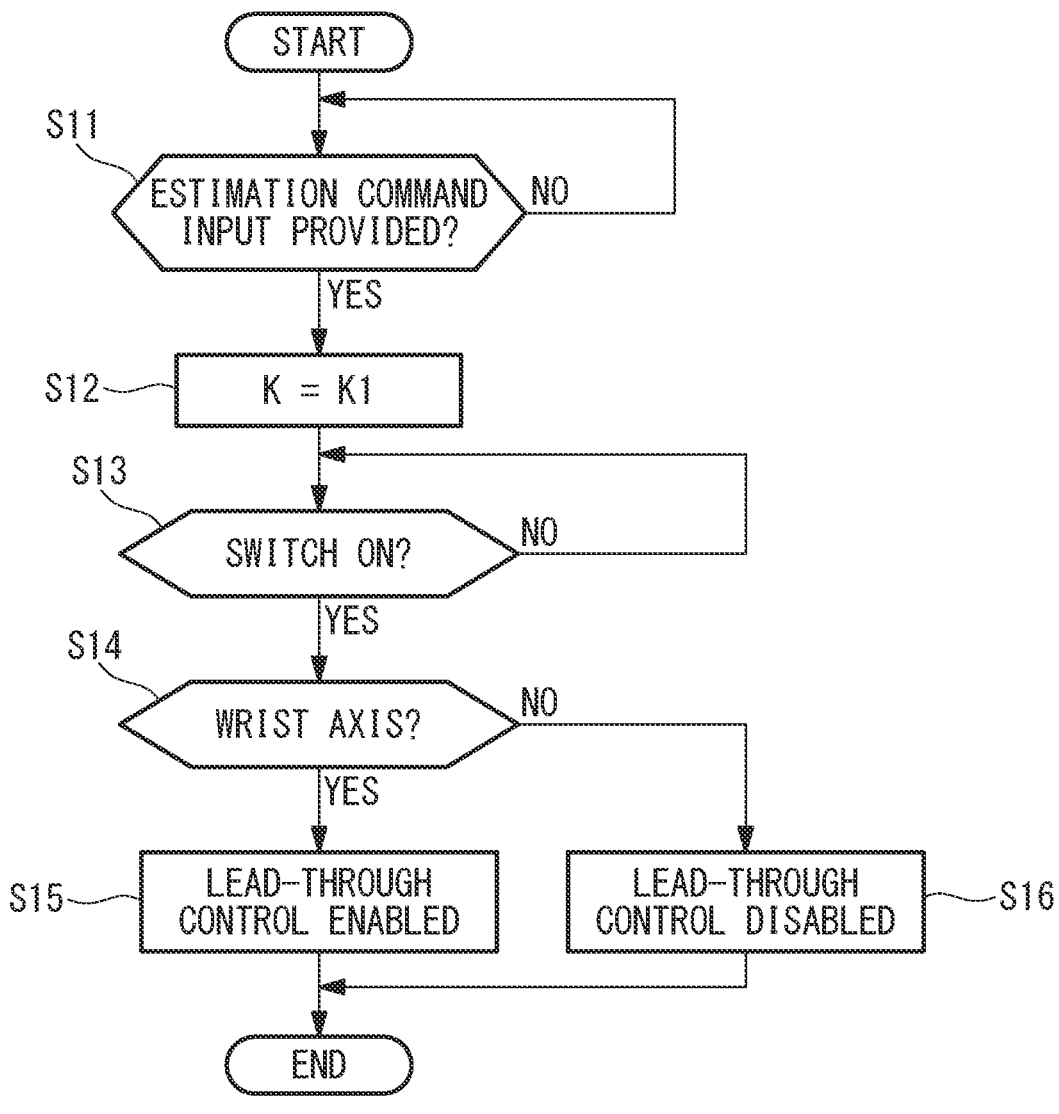
FIG. 8 is a flowchart illustrating lead-through control by the robot controller in FIG. 6.

In this case, as shown in FIG. 8, in the robot controller 50 of this embodiment, the load information estimating unit 51 waits for the input of the load identification information and the estimation command for the load information (step S11). When the load identification information and the estimation command for the load information are input, the load information estimating unit 51 commands the lead-through sensitivity setting unit to set the gain K of the lead-through control to K1 to reduce the sensitivity (step S12).

Then, the load information estimation unit 51 determines whether or not the switch 9 is switched to the ON state (step S13). When it is switched, it determines whether or not the axis to be moved by the lead-through control is the wrist axis (step S14). When the wrist axis is moved, the lead-through control is enabled (step S15), and when an axis other than the wrist axis is moved or when the switch 9 is in the OFF state, the lead-through control is disabled (step S16).

When teaching the robot 100 using the lead-through control with the load information estimation work completed and the accurate load information stored in the storage unit, it is sufficient to perform the lead-through control according to the flowchart in FIG. 4 or FIG. 5 without inputting the estimation command. Alternatively, for a load for which the load information estimation has been performed, a flag indicating that the estimation has already been performed may be set, and when selecting a load stored in the storage unit 4 and starting the lead-through control, if the flag has been set, the gain may be set to K0.

Thus, with the robot controller 50 according to this embodiment, when the load information estimation by the load information estimating unit 51 is commanded, the accurate load information may not be stored, and therefore, the sensitivity of the lead-through control can be reduced to restrict the movement of the robot 100. This prevents the robot 100 from moving abruptly in a direction contrary to the user's intention based on inaccurate load information when the robot 100 is moved by the lead-through control during the load information estimation process.

In this embodiment, both reducing the sensitivity of the lead-through control and restricting the axis for which the lead-through control is enabled to the wrist axis are employed as restrictions on the movement of the robot 100 during the load information estimation process, but only one of them may be employed. The travel distance of the robot 100 may also be restricted in the same manner as in FIG. 5.

Although the embodiments of the present disclosure were described in detail, the present disclosure is not limited to the individual embodiments described above. These embodiments can be variously added, replaced, modified, partially deleted, etc., to the extent not departing from the gist of the invention or from the idea and purpose of the invention derived from the claims and their equivalents. For example, the order of each operation and the order of each process in the above mentioned embodiments is shown as an example and is not limited to these. The same is true when numerical values or mathematical formulas are used in the above description of the implementation.

The invention claimed is:

1. A robot controller, comprising:
at least one memory configured to store user-input load information including a mass and a center of gravity position of a load to be attached to a robot; and
at least one processor configured to:
execute lead-through control of the robot based on an external force detected by a sensor on the robot and the load information;
determine whether or not the load information is suitable; and
estimate, in response to a command from a user to estimate the load information, the load information based on the external force detected by the sensor in a state of the robot being set in a predetermined posture,
wherein the at least one processor is configured to determine whether or not the load information is suitable, based on information obtained during the lead-through control, and to determine that the load information has a possibility of being unsuitable in a case in which the estimating of the load information has not been performed according to the command from the user, or in a case in which a value obtained based on the external force detected by the sensor exceeds a predetermined threshold, and
wherein, in response to determining that the load information has the possibility of being unsuitable, the at least one processor is configured to restrict the lead-through control to only a wrist axis of the robot.

2. The robot controller according to claim 1, further comprising a switch, wherein:

the at least one processor is configured to execute position control of the robot based on a position command, the switch switches between the position control and the lead-through control, in a case of switching to the lead-through control via the switch, if an estimated force value applied by the user, which is estimated based on the external force detected by the sensor and the load information, exceeds the predetermined threshold value, at least one processor is configured to determine that the load information has a possibility of being unsuitable.

3. The robot controller according to claim 2, wherein, if the estimated value becomes equal to or less than the threshold value after the lead-through control is restricted to only the wrist axis of the robot by the estimated value exceeding the threshold, the restriction is lifted.

4. The robot controller according to claim 1, wherein, if it is determined that the load information has a possibility of being unsuitable, sensitivity of the wrist axis of the robot to the external forces is reduced.

5. The robot controller according to claim 1, wherein, if it is determined that the load information has a possibility of being unsuitable, a distance of the movement of the wrist axis of the robot in response to the external force is restricted.

6. The robot controller according to claim 1, wherein the at least one processor is configured to record the external force detected by the sensor and a position of a motor of the robot in a state in which the robot is set in a plurality of postures, and to estimate the load information based on the recorded external force and the recorded motor position.

7. The robot controller according to claim 1, wherein the restriction of the lead-through control is applied based on the external force estimated at a start of the lead-through control.

* * * * *